(12) United States Patent
Haley

(10) Patent No.: US 8,505,954 B1
(45) Date of Patent: Aug. 13, 2013

(54) ROTATIVE ANTI-THEFT BAR LOCK FOR TRACTOR TRAILERS

(76) Inventor: Robert Haley, Glen Cove, NY (US)

(*) Notice: Subject to any disclaimer, the term of this patent is extended or adjusted under 35 U.S.C. 154(b) by 210 days.

(21) Appl. No.: 13/176,676

(22) Filed: Jul. 5, 2011

(51) Int. Cl.
*B62D 53/08* (2006.01)

(52) U.S. Cl.
USPC ............. 280/507; 70/258; 280/433; 340/431

(58) Field of Classification Search
USPC ................. 280/507, 433, 423.1, 432; 70/14, 70/57.1, 237, 226, 34, 227, 258; 340/426.11, 340/431
See application file for complete search history.

(56) References Cited

U.S. PATENT DOCUMENTS

| | | | |
|---|---|---|---|
| 2,969,993 A * | 1/1961 | Jasper | 280/433 |
| 3,135,528 A | 6/1964 | Martin | |
| 4,556,232 A | 12/1985 | Sever | |
| 4,614,357 A | 9/1986 | Murray | |
| 6,070,688 A | 6/2000 | Schulz | |
| 6,073,470 A * | 6/2000 | Burnitzki et al. | 70/226 |
| 6,109,078 A * | 8/2000 | Marshall | 70/232 |
| 6,394,480 B1 | 5/2002 | Brennan | |
| 6,729,595 B2 * | 5/2004 | Smith | 248/518 |
| 2008/0295549 A1 * | 12/2008 | Hsieh | 70/57.1 |
| 2010/0266336 A1 * | 10/2010 | Bickel, III | 403/408.1 |
| 2012/0182139 A1 * | 7/2012 | Raines | 340/431 |

FOREIGN PATENT DOCUMENTS

| | | |
|---|---|---|
| EP | 0.051.464 | 12/1982 |
| EP | 0.697.328 | 2/1996 |
| FR | 2.587.662 | 3/1987 |
| GB | 2.256.176 | 12/1992 |
| NL | 8801145 | 12/1989 |
| WO | WO01/28846 | 4/2001 |
| WO | WO2004/096626 | 11/2004 |

* cited by examiner

*Primary Examiner* — Anne Marie M Boehler
(74) *Attorney, Agent, or Firm* — Michael I. Kroll

(57) ABSTRACT

An easy to use trailer anti-theft device that forms an integral part of said trailer comprising a front exterior wall mounted locking mechanism having a rotatable lock bar extending therefrom with the lock bar having an upper arm pivotally and swivelably connected to a lower swing bar that can be unlocked and moved from a stored position to a downwardly depending blocking position. The lock bar has a partially rotative lower swing arm that under force extends under the trailer substantially in the direction of the trailer king pin.

14 Claims, 12 Drawing Sheets

ROTATIVE ANTI-THEFT BAR LOCK FOR TRACTOR TRAILERS

BACKGROUND OF THE INVENTION

1. Field of the Invention

The present invention relates generally to locks and, more specifically, to a trailer mountable bar lock to prevent a tractor's fifth wheel from engaging the trailer's king pin.

The trailer mountable bar lock is preferably mounted to the trailer's exterior front wall so that the lock bar is peripherally within the confines of the front wall and when unlocked extends vertically beneath the trailer with the pivot point of the swing arm positioned at approximately the base of the trailer so that when pivoted the swing arm will engage the bottom of the trailer.

Also provided is a swivel joint allowing for limited rotation of the swing arm to compensate for angular swing arm movement when a tractor attempts to hookup from an angle.

2. Description of the Prior Art

There are other antitheft devices designed for trailers having king pins. While these devices may be suitable for the purposes for which they where designed, they would not be as suitable for the purposes of the present invention as heretofore described.

It is thus desirable to provide a locking mechanism for unattached trailers to prevent unauthorized tractor hookup to said trailers by mounting a king pin blocking member comprising a rotatable locking housing having a lock bar extending therefrom.

It is further desirable to provide a swing arm rotative sleeve allowing limited rotative movement of the swing arm to prevent angular attempts to hookup to the trailer.

SUMMARY OF THE PRESENT INVENTION

A primary object of the present invention is to provide a trailer antitheft device that is permanently attached to a trailer.

Another object of the present invention is to provide a trailer antitheft device having housing incorporating a locking mechanism with a lock bar extending therefrom.

Yet another object of the present invention is to provide a trailer antitheft device wherein said lock bar rotates between a substantially unblocking horizontal position to a downwardly extending blocking position.

Still yet another object of the present invention is to provide a trailer antitheft device wherein said lock bar has a top portion, and a bottom portion.

Another object of the present invention is to provide a trailer antitheft device wherein the top portion is fixedly attached to the lock mechanism at one distal end with the bottom portion mounted to the other distal end.

A further object of the present invention is to provide a trailer antitheft device wherein said bottom portion comprises a collar portion and a pivotally attached longitudinal portion extending therefrom.

A yet further object of the present invention is to provide a trailer antitheft device wherein said bottom collar portion provides for partial rotation of said bottom portion.

A still yet further object of the present invention is to provide a trailer antitheft device wherein said pivotally attached longitudinal member pivotally extends under the trailer when a force is applied thereto.

Another object of the present invention is to provide a trailer antitheft device that when moved to a blocking position prevents access to the trailer's king pin by a tractors fifth wheel by keeping the fifth wheel spaced away from the king pin by virtue of the pivotal longitudinal member.

Yet another object of the present invention is to provide a trailer antitheft device that is simple to manufacture.

Still yet another object of the present invention is to provide a trailer antitheft device that is simple to use.

An additional object of the present invention is to provide a trailer locking mechanism that doesn't require crawling under the trailer to attach a fastenable king pin locking member.

Additional objects of the present invention will appear as the description proceeds.

The present invention overcomes the shortcomings of the prior art by providing an easy to use trailer antitheft device that forms an integral part of said trailer comprising a front exterior wall mounted locking mechanism having a rotatable lock bar extending therefrom with the lock bar having an upper arm pivotally and swivelably connected to a lower swing bar that can be unlocked and moved from a stored position to a downwardly depending blocking position. The lock bar has a partially rotative lower swing arm that under force extends under the trailer substantially in the direction of the trailer king pin.

The rotative collar provides for partial rotation of the longitudinal blocking member when an attempt is made to hook up a tractor to said trailer from an angle.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
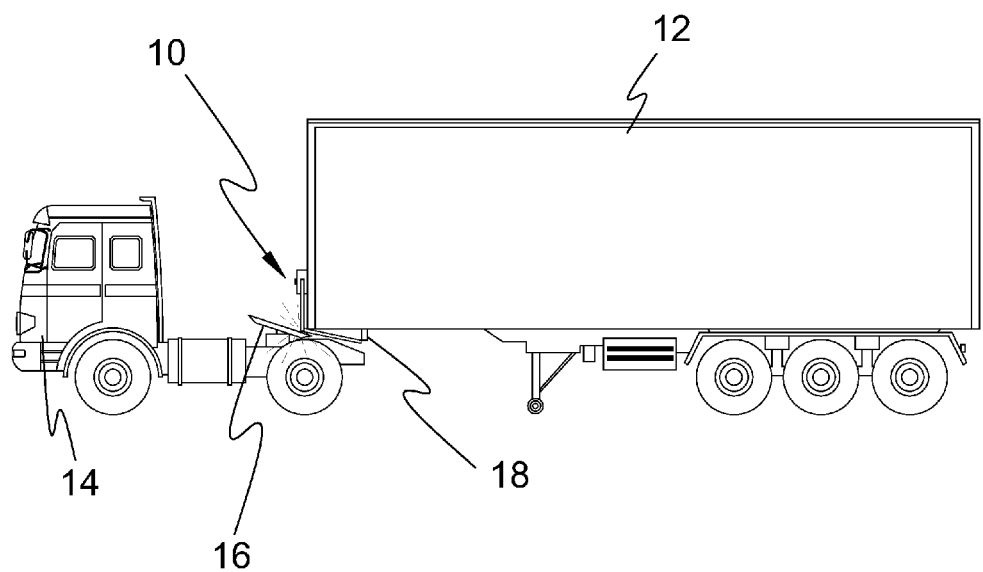
FIG. 1 is an illustrative view of the trailer bar lock of the present invention in use.

Turning now descriptively to the drawings, in which similar reference characters denote similar elements throughout the several views, the figures illustrate the Trailer Lock Bar Anti-theft Device of the present invention. With regard to the reference numerals used, the following numbering is used throughout the various drawing figures.

- 10 Trailer Lock Bar Anti-theft Device of the present invention
- 12 trailer
- 14 tractor
- 16 fifth wheel of 14
- 18 king pin
- 20 housing
- 22 key lock
- 24 lock bar
- 26 upper arm of 24
- 28 swing arm of 24
- 30 pivot joint
- 32 swivel joint
- 34 bolts
- 36 pivot point of 24
- 38 first end of 26
- 40 second end of 26
- 42 terminus end of 28
- 44 collar of 32
- 46 slot of 44
- 48 stop element of 32
- 50 rotative shaft of 32
- 52 first end of 28
- 54 audible alarm
- 56 pivot joint apertures
- 58 pivot joint pin

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

FIG. 1 is an illustrative view of the trailer bar lock 10 of the present invention in use. The present invention is an antitheft device for an unattached trailers 12 that prevents a tractor 14 from hooking its fifth wheel 16 to the trailer's king pin 18, making the trailer 12 impossible to haul away.

Figure 2:
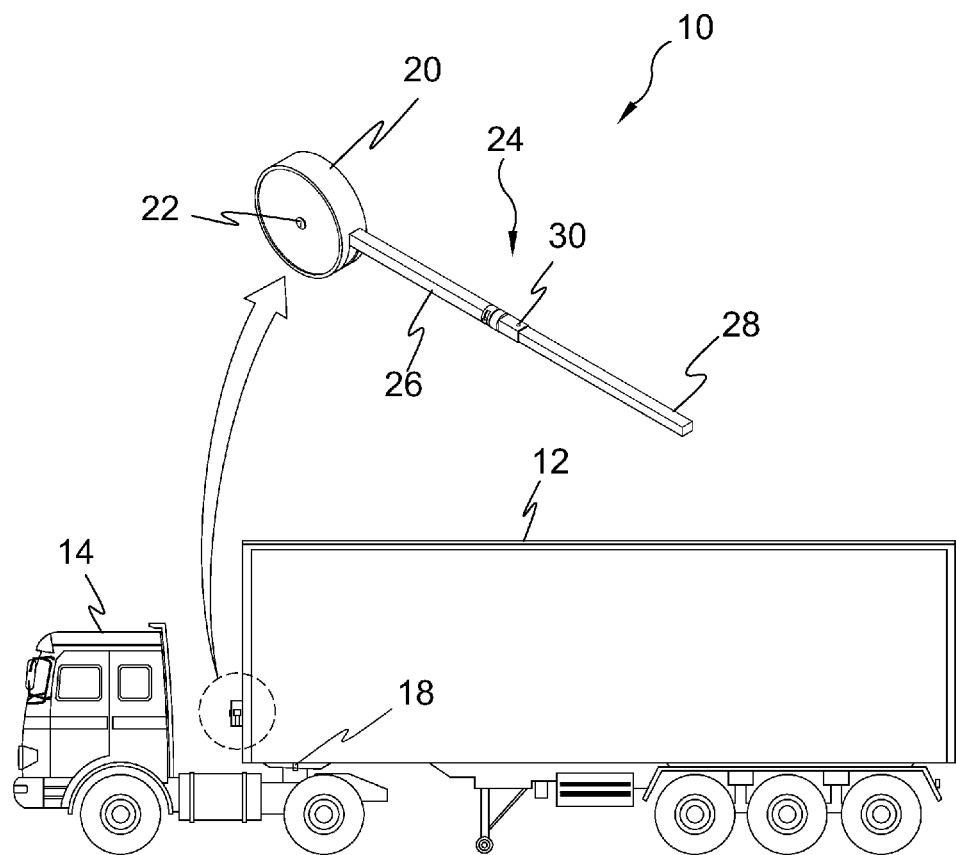
FIG. 2 is a side and detail view of the present invention.

FIG. 2 is a side and detail view of the present invention in the raised unblocked position. The present invention is a trailer bar anti theft device 10 comprising a housing 20 with a key lock 22 for a rotatable lock bar 24 with an upper arm 26 and a swing arm 28 connected by a pivot joint 30 extending therefrom movable between a blocking position and an unblocking position. The bar, deployable to a king pin 18 blocking position, incorporates a pivotal segment to prevent damage to the blocking member under a determined force while preventing coupling with a tractor. Optionally, the anti theft device further incorporates means for engaging an alarm when said pivotal segment pivots.

Figure 3:
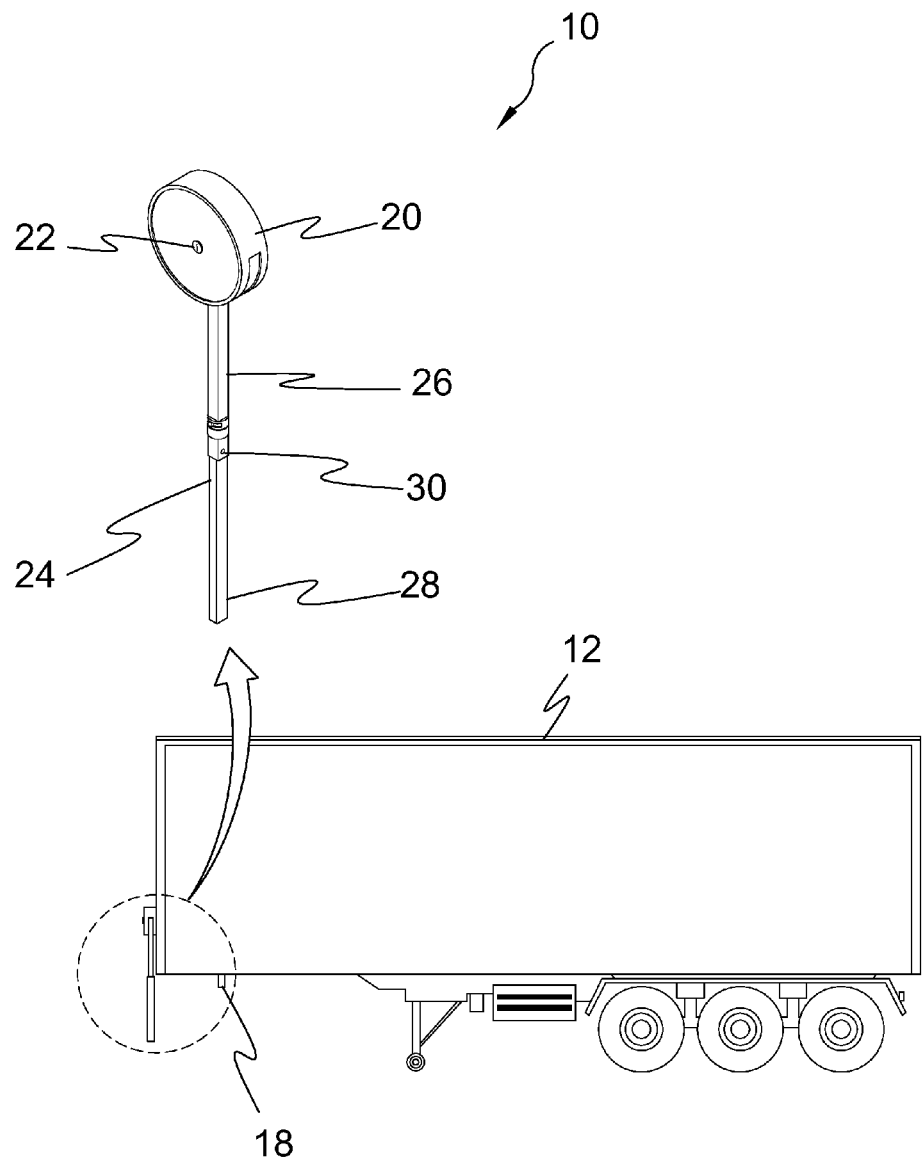
FIG. 3 is a side and detail view of the present invention in a lock down position.

FIG. 3 is a side and detail view of the present invention in a lock down position. The present invention is a trailer bar anti theft device 10 comprising a housing 20 with a key lock 22 having a rotatable lock bar 24 with an upper arm 26 and a swing arm 28 connected by a pivot joint 30 extending therefrom movable between a blocking position and an unblocking position. Shown is the present invention lowered into a lock down position effectively blocking the hitching of a trailers fifth wheel to the king pin 18 by creating an un-closable gap with the swing arm.

Figure 4:
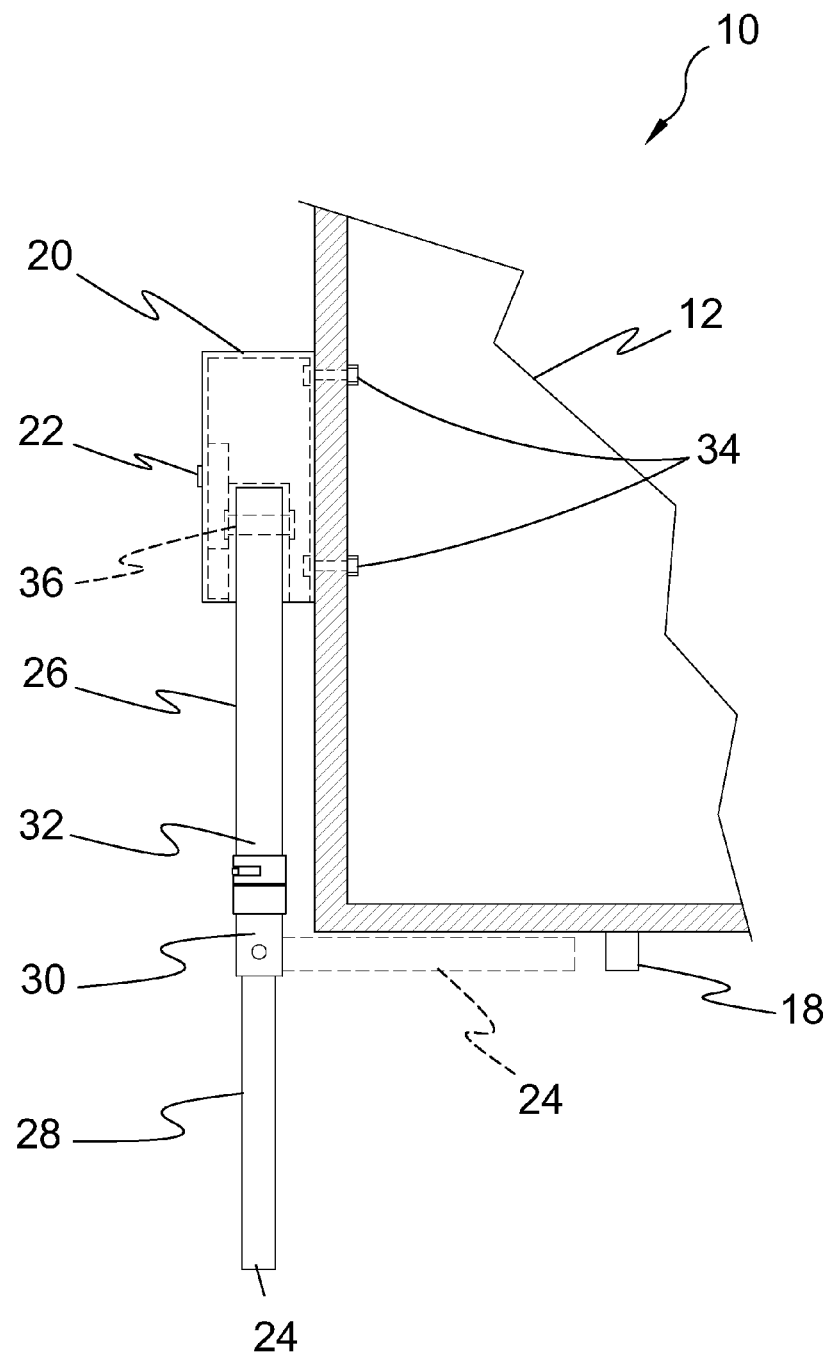
FIG. 4 is a side sectional view of the present invention in a lock down position.

FIG. 4 is a side sectional view of the present invention in a lock bar down position. Shown is a sectional view of the trailer bar lock anti theft device 10 for a trailer 12 comprising a housing 20 bolted 34 to the trailer 12 wall having a key lock 22 with a pivot point 36 for a rotatable lock bar 24 comprising an upper arm 26 and swing arm 28 connected by a pivot joint 30 and a swivel joint 32 movable between a trailer coupling blocking position and an unblocking position. The bar, deployable to a king pin 18 blocking position, incorporates a pivotal segment that under an applied force moves under the trailer preventing coupling with the tractor.

Figure 5:
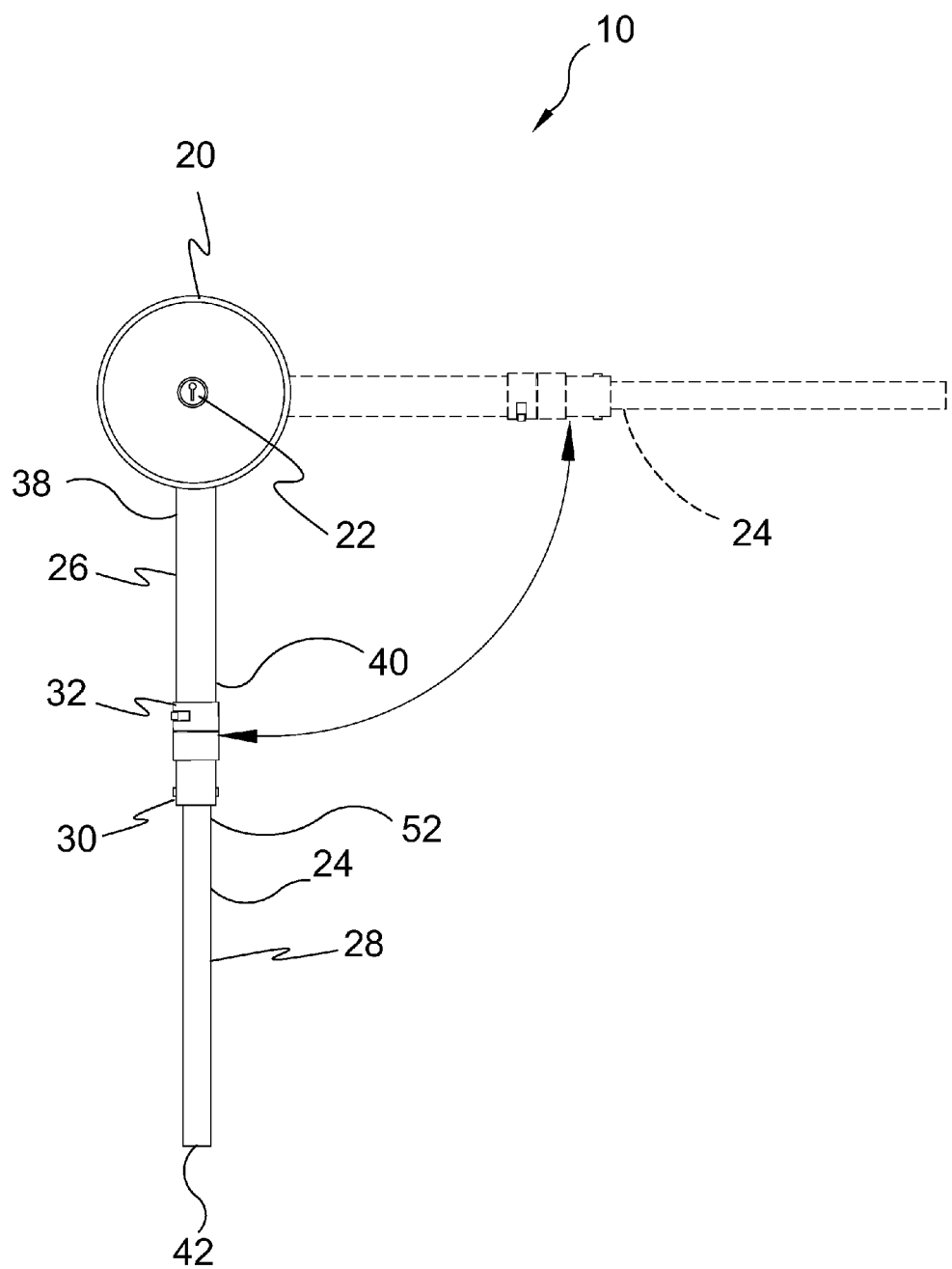
FIG. 5 is a frontal view of the present invention in a lock down position.

FIG. 5 is a frontal view of the present invention in a lock down position. Shown is a sectional view of the trailer bar lock anti theft device 10 for a trailer 12 comprising a housing 20 with a rotatable lock bar 24 comprising an upper arm 26 with a first end 38 and a second end 40 and a swing arm 28 having a first end 52 connected by a pivot joint 30 and a swivel joint 32 with said swing arm 28 having a terminus end 42 movable between a trailer coupling blocking position and an unblocking position relative to the king pin.

Figure 6:
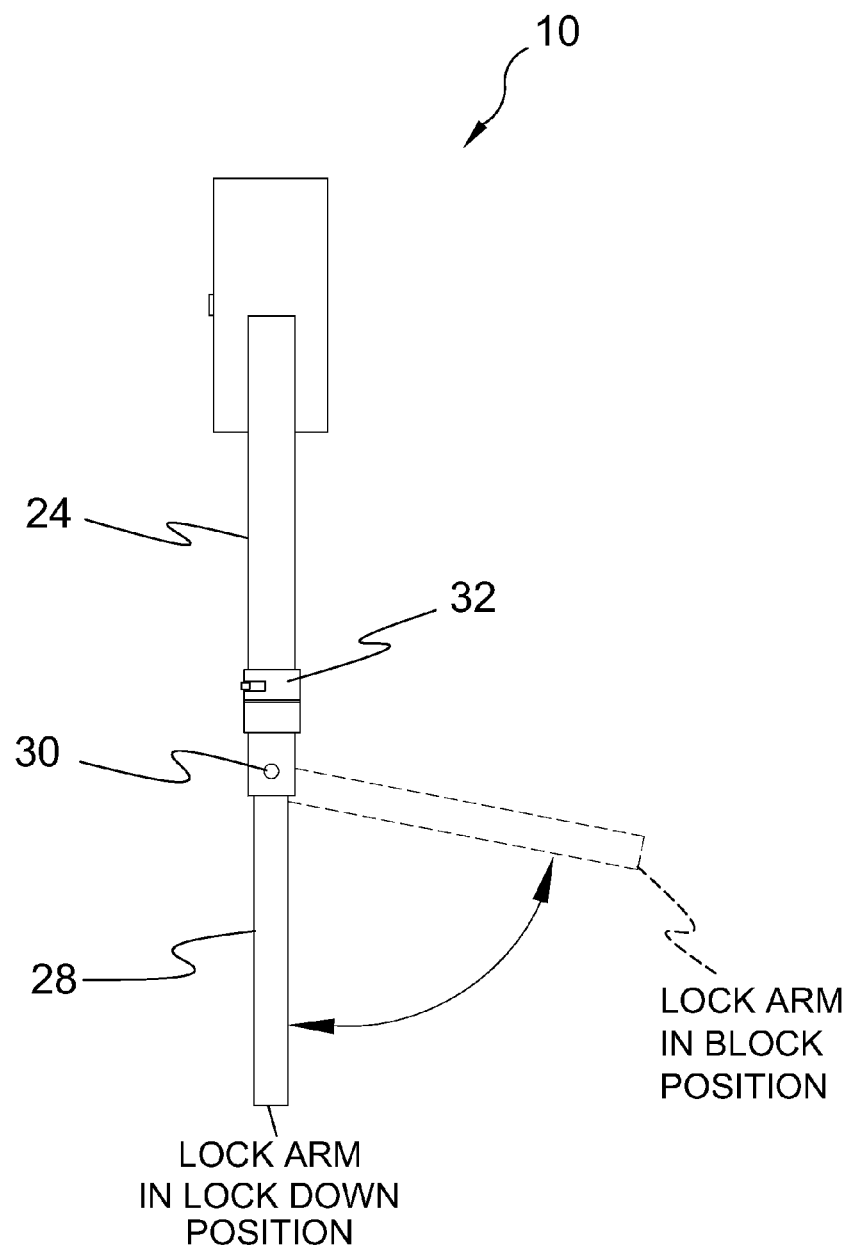
FIG. 6 is a side view of the present invention in a lock down position.

FIG. 6 is a side view of the present invention in a lock down and block positions. Shown is a side view of the trailer bar lock anti theft device 10 having a pivot joint 30 that serves to give way in the event of a trailer trying to attach its fifth wheel to a trailer's king pin. Also shown is a swivel joint 32 providing limited swing arm 28 rotation to prevent damage to the bar by a trailer attempting to circumvent the lock bar 24 by angularly coupling to the trailer's king pin.

Figure 7:
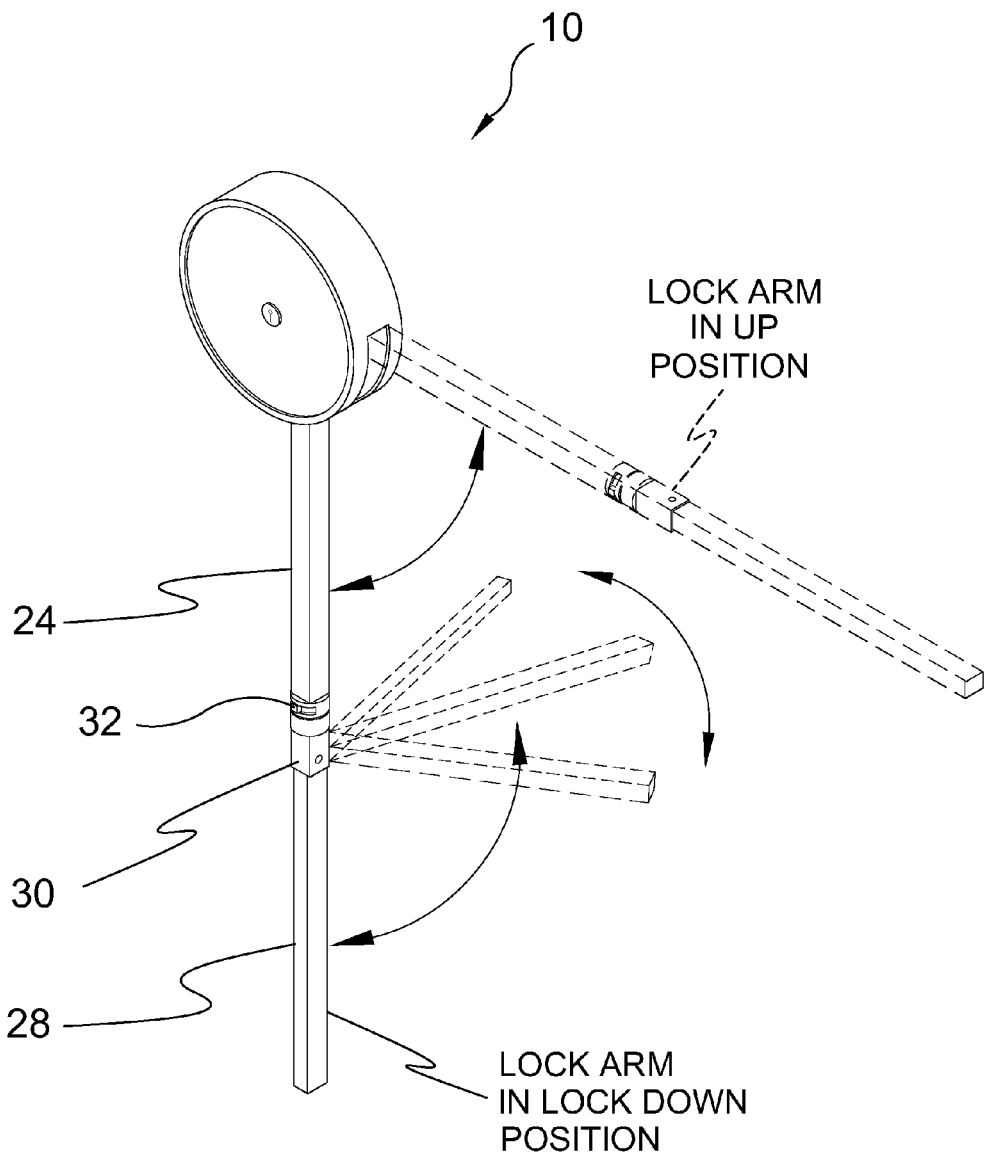
FIG. 7 is a perspective view of the present invention.

FIG. 7 is a perspective view of the present invention. Shown is a perspective view of the trailer bar lock anti theft device 10 depicting the range of motion utilized by the device comprising rotating the lock bar 24 from a substantially horizontal locked position to a vertical locked position. A pivotal swing arm 28 is movable along a pivot joint 30 from a vertical position to a trailer king pin blocking position and a rotative swivel joint 32 for partially rotating the swing arm 28 to prevent angularly hitching a tractor to the trailer.

Figure 8:
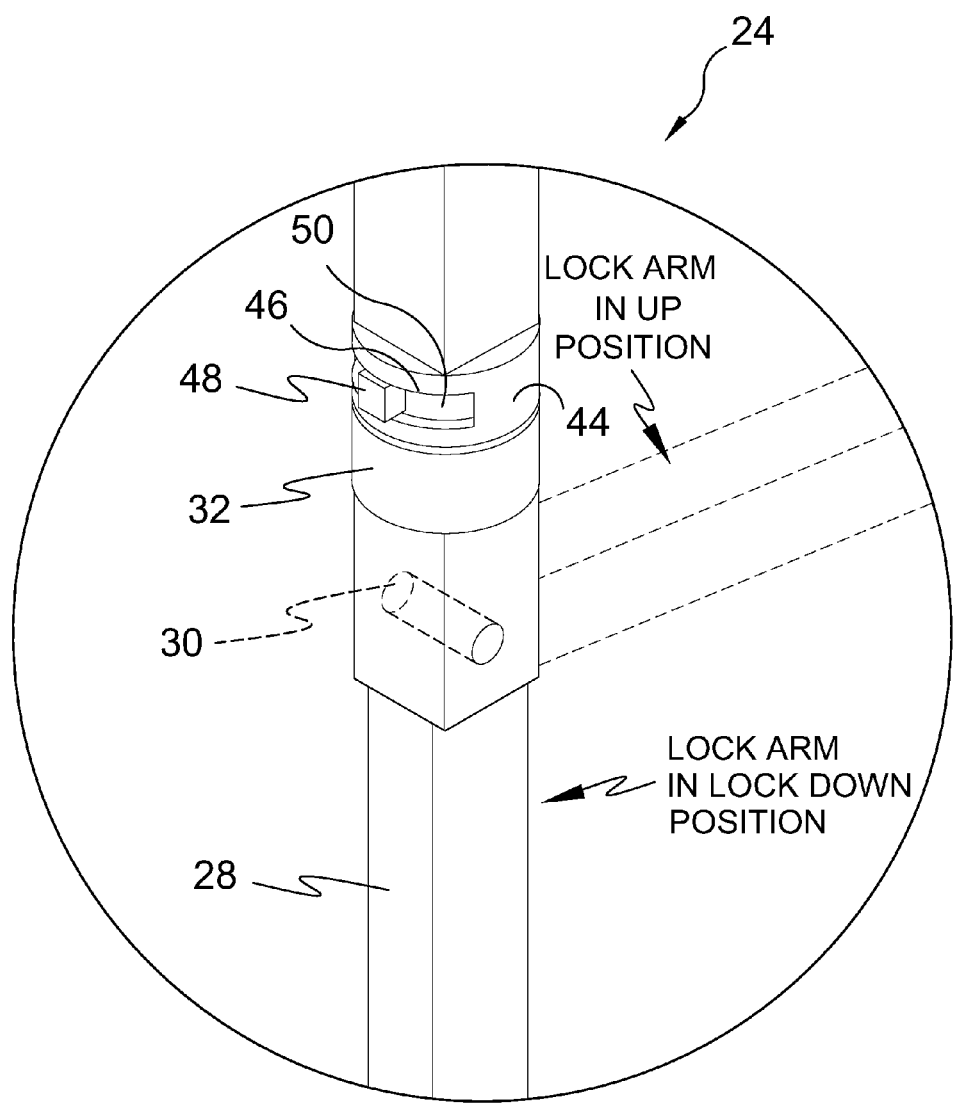
FIG. 8 is an enlarged view of the lock bar of the present invention.

FIG. 8 is an enlarged view of the lock bar 24 of the present invention. Shown is an enlarged view of the rotative pivot joint 30 for extending under a trailer and a swivel joint 32 comprises a stationary collar 44 with a slot 46 extending partially therethrough and a rotative shaft 50 with a stop 48 projecting therefrom through said slot 46 for allowing the limited movement of the swing arm 28 moving in an angular direction to prevent damage to the lock bar 24 while backing up at an angle.

Figure 9:
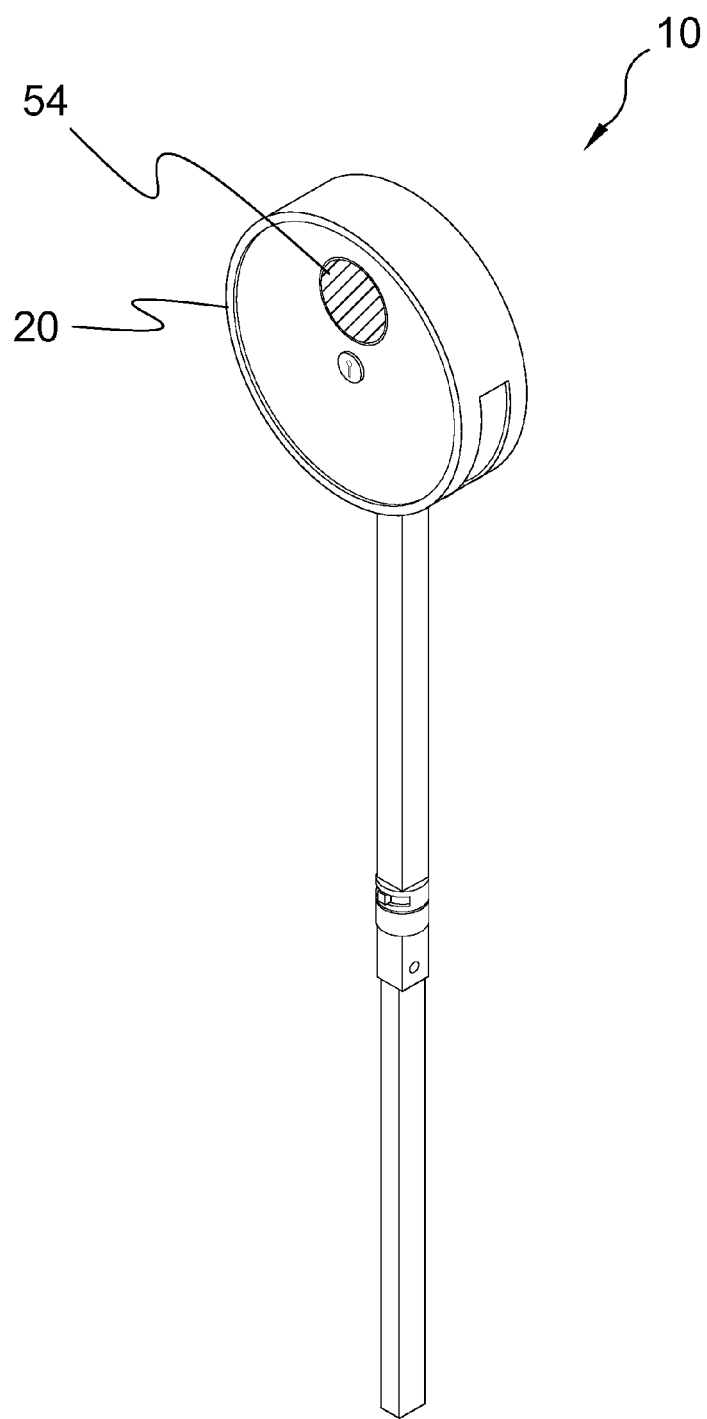
FIG. 9 is a perspective view of an additional element of the present invention.

FIG. 9 is a perspective view of an additional element of the present invention. The trailer bar lock anti theft device 10 further incorporates means for engaging an audible alarm 54 integral with said housing 20 when said pivotal segment pivots.

Figure 10:
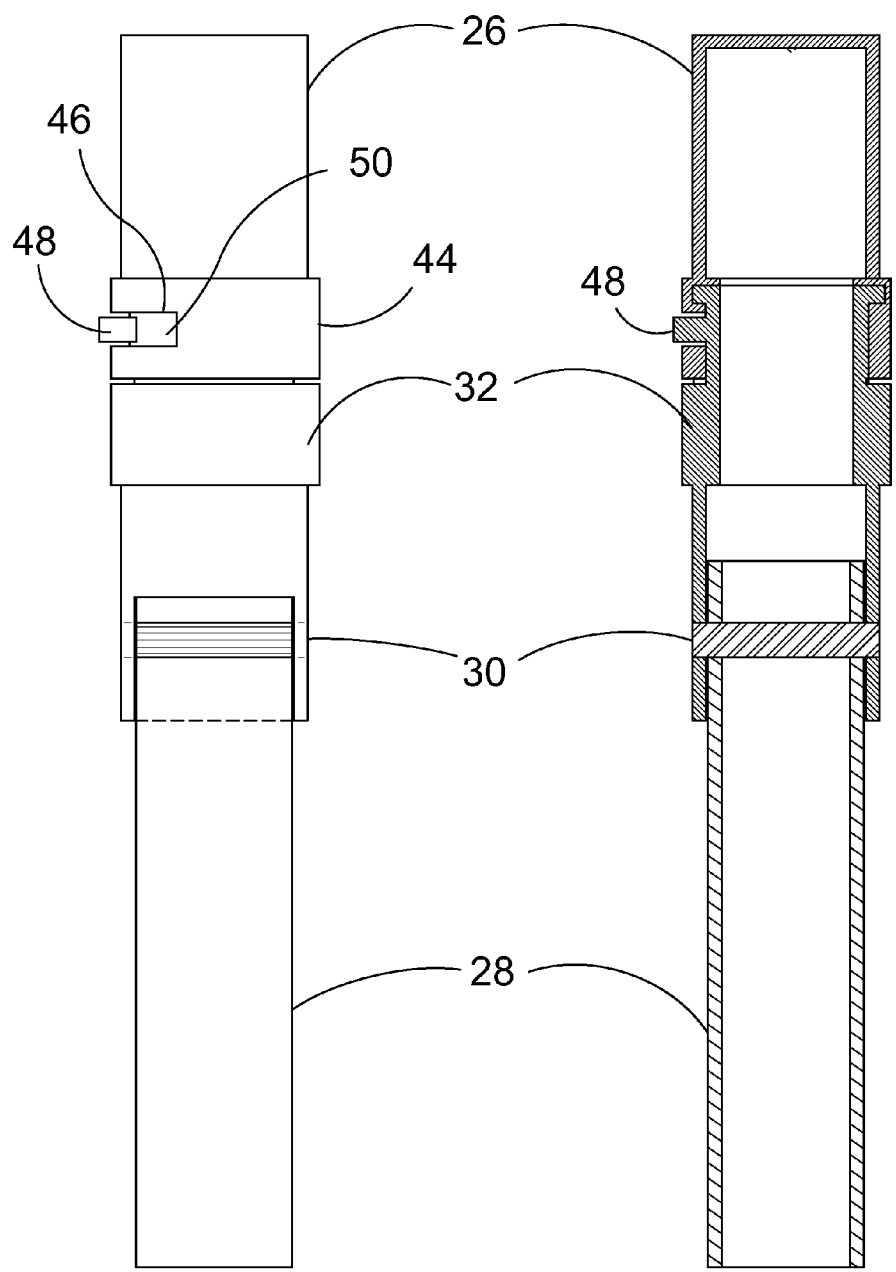
FIG. 10 is an enlarged view of the swiveling pivot joint of the bar lock of the present invention.

FIG. 10 is an enlarged view of the swiveling joint 32 and pivoting joint 30 connecting the upper arm 26 and the swing arm 28. Shown is the collar 44 and slot 46 with the stop element 48 projecting from the interior rotative shaft 50.

Figure 11:
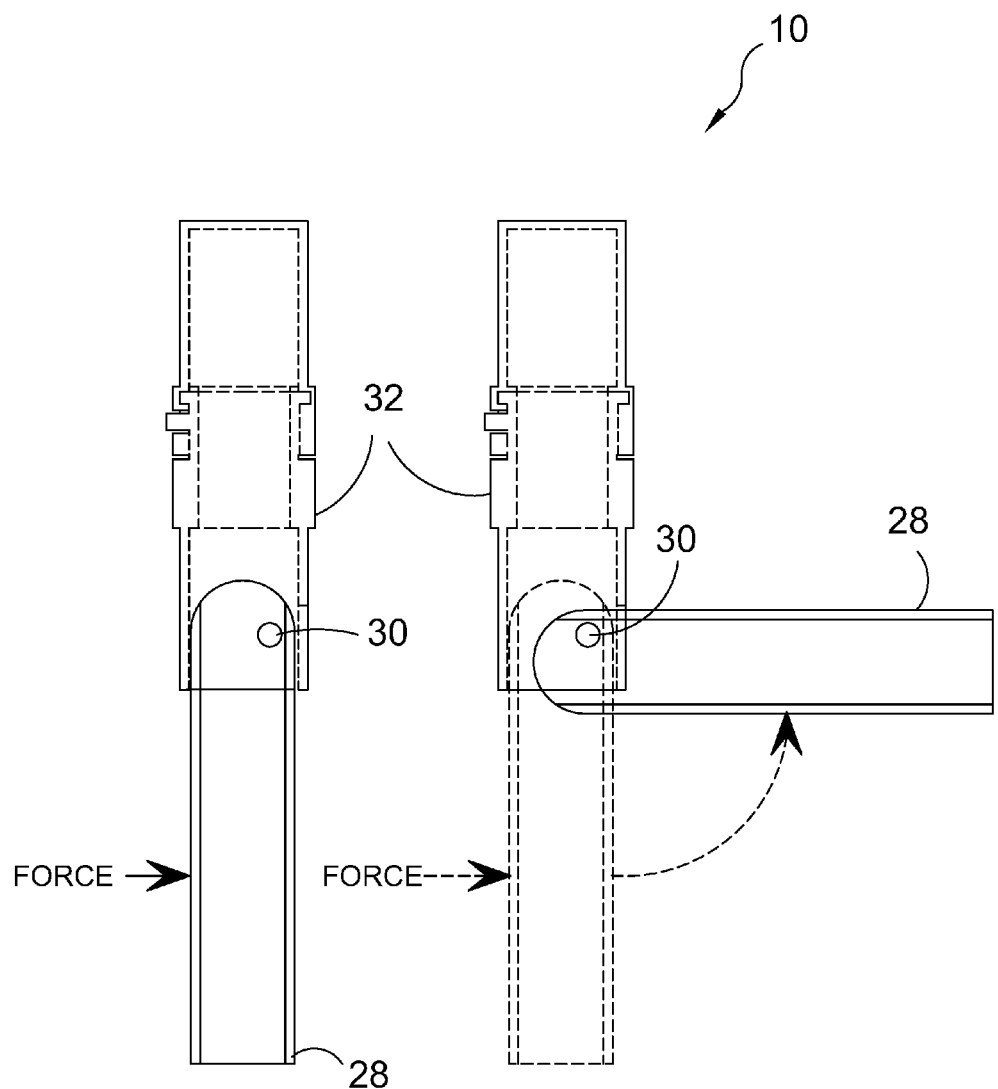
FIG. 11 is an enlarged view of the swiveling pivot joint of the bar lock of the present invention.

FIG. 11 is an enlarged view of the pivot joint 30 of the bar lock 24 of the present invention. Shown is an enlarged sectional view of the swing arm 28 depicting the structure of a pivoting joint 30 and a swivel joint 32 in its construction. Additionally shown is the swing arm 28 bending and giving way at its pivot direction upon the application of force.

Figure 12:
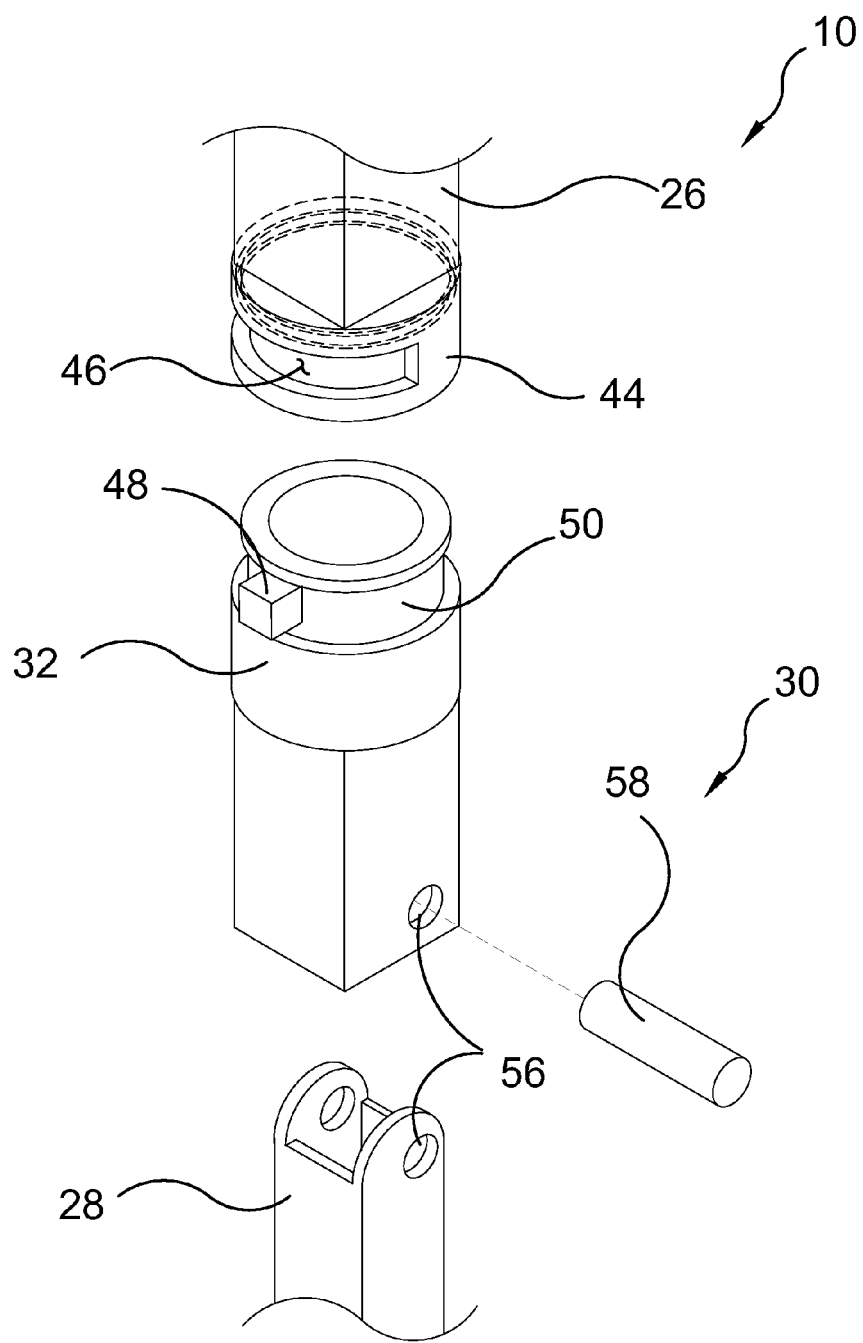
FIG. 12 is an exploded view of the present invention.

FIG. 12 is an exploded view of the present invention. Shown is a detailed view of the components comprising the lock bar 24 having a pivot joint 30 with a pin 58 and corresponding apertures 56 and swivel joint 32 in communication with the swing arm 28 and the swivel joint 32. Also depicted is the relationship between the slotted 46 collar 44 affiliated with the upper arm 26 and the shaft 50 and stop 48 which allows for limited rotation of the swing arm 28.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A rotative anti-theft bar lock for tractor trailers comprising:
 a) a housing mountable to a front wall of a trailer;
 b) a lock bar rotatively associated with said housing comprising an upper arm with a first end that rotates through the sidewall of said housing, a second end that terminates below the bottom edge of said trailer, and a swing arm pivotally connected to said second end of said upper arm with a pivot joint having a pin that passes through corresponding apertures in said swing arm and a swivel joint; and
 c) said swing arm having a terminus end that is of a length wherein said end terminates at a point adjacent to the front portion of the king pin of said trailer when in the blocking position; and
 d) means for locking said lock bar in a selected position.

2. The rotative anti-theft bar lock for tractor trailers according to claim 1, wherein said locking means for said lock bar is a key lock in said housing.

3. The rotative anti-theft bar lock for tractor trailers according to claim 1, wherein said lock bar is locked in the horizontal position with said upper arm and said swing arm in linear relation when in the non-blocking position.

4. The rotative anti-theft bar lock for tractor trailers according to claim 3, wherein said lock bar is unlocked and rotated into a vertical blocking position.

5. The rotative anti-theft bar lock for tractor trailers according to claim 4, wherein said swing arm is pivoted into a substantially horizontal position upon application of force thereto with said terminus end proximal to the front portion of said king pin to achieve the blocking position.

6. The rotative anti-theft bar lock for tractor trailers according to claim 5, wherein having the swing arm in the blocking position prohibits a fifth wheel of a tractor from uniting with said king pin.

7. The rotative anti-theft bar lock for tractor trailers according to claim 1, further comprising an audible alarm disposed in said housing that engages when a hookup is attempted with the lock arm engaged in the blocking position.

8. A bar lock anti-theft device for trailers comprising:
 a) a housing for mounting on the external front side of a trailer; and
 b) a lock bar associated with said housing comprising;
  i) an upper arm having a first end rotatively connected to said housing and a second end;
  ii) a swing arm having a first end and a second terminus end;
  iii) a pivot joint pivotally coupling said second end of said upper arm to said first end of said swing arm; and
  iv) a locking mechanism incorporated with said housing for locking said lock bar in position; and
 c) wherein said lock bar is moved from the unblocking position to the blocking position by unlocking said lock mechanism and moving said lock bar from the horizontal state to the vertical position and said swing arm pivots to a substantially horizontal position when force is applied thereto thereby placing the terminus end thereof next to said king pin thereby forming an unbreachable gap thus effectively denying access of said king pin to the fifth wheel of a tractor.

9. The bar lock anti-theft device for trailers recited in claim 8, further comprising an audible alarm that is activated when a tractor attempts to hook up to said trailer when said lock bar is in the blocking position.

10. A method of utilizing an anti-theft bar lock device to prevent the unauthorized removal of a dropped trailer by a tractor comprising the steps:
 a) providing an anti-theft bar lock device comprising a housing for mounting on the external front side of a trailer, a lock bar associated with said housing comprising an upper arm having a first end rotatively integral with said housing and a second end, a swing arm having a first end and a second terminus end, a pivot joint pivotally connected to said first end of said swing arm, a swivel joint connecting said pivot joint with said upper arm to compensate for angular swing arm movement when a tractor attempts to hook-up from an angle, said swivel joint comprising an external stationary collar with a slot disposed therein, an inner rotative shaft and a stop element projecting from said shaft through said slot in said collar thereby limiting angular swing arm movement when said stop abuts an end of said slot, and a locking mechanism incorporated with said housing for locking said lock bar in position;
 b) mounting said anti-theft locking device to said trailer wherein said pivot joint is situated below the bottom side of said trailer;
 c) using said lock mechanism to lock said lock bar in a substantially horizontal non-blocking position;
 d) backing up an authorized tractor to hook up the fifth wheel thereof with said kingpin and moving and dropping said trailer;
 e) removing said fifth wheel of said tractor from said king pin and moving said tractor therefrom;
 f) unlocking said lock mechanism and rotating said lock bar into a substantially vertical position;
 g) locking said lock bar with said lock mechanism;
 h) pivoting said swing arm to a substantially horizontal plane when a bias is applied thereto thus placing said terminus end thereof proximal to said king pin thereby blocking and preventing access to said king pin by the fifth wheel of a tractor; and
 i) reversing the procedure for authorized use of said trailer.

11. The method of utilizing an anti-theft bar lock device to prevent the unauthorized removal of a dropped trailer according to claim 10, wherein said housing further comprises an audible alarm for activation when an unauthorized hook-up of said trailer is attempted.

12. A rotative anti-theft bar lock for tractor trailers comprising:
   a) a housing mountable to the front wall of a trailer;
   b) a lock bar rotatively associated with said housing comprising an upper arm with a first end that rotates through the sidewall of said housing, a second end that terminates below the bottom edge of said trailer, a swing arm pivotally connected to said second end of said upper arm with a pivot joint having a pin that passes through corresponding apertures in said swing arm and a swivel joint, and said swivel joint to allow for limited rotation of said swing arm to compensate for angular swing arm movement when a tractor attempts to hookup from an angle, said swivel joint including a stationary collar with a slot disposed therein and a rotative inner shaft with a stop element projecting through said slot; and
   c) means for locking said lock bar in a selected position.

13. The rotative anti-theft bar lock for tractor trailers according to claim 12, wherein said stop element restricts the rotation of said inner shaft when abutted against one of the sides of said slot.

14. A bar lock anti-theft device for trailers comprising:
   a) a housing for mounting on the external front side of a trailer;
   b) a lock bar associated with said housing comprising;
      i) an upper arm having a first end rotatively connected to said housing and a second end;
      ii) a swing arm having a first end and a second terminus end;
      iii) a pivot joint pivotally coupling said second end of said upper arm to said first end of said swing arm; and
      iv) a locking mechanism incorporated with said housing for locking said lock bar in position; and
   c) a swivel joint to allow for limited rotation of said swing arm to compensate for angular swing arm movement when a tractor attempts to hookup from an angle, said swivel joint comprising:
      a) an external stationary collar;
      b) an inner rotative shaft;
      c) a slot disposed in said collar; and
      d) a stop element projecting from said shaft through said slot in said collar thereby limiting angular swing arm movement when said stop abuts an end of said slot.

* * * * *